(12) United States Patent
Umans et al.

(10) Patent No.: US 8,872,465 B2
(45) Date of Patent: Oct. 28, 2014

(54) SYNCHRONOUS MOTOR WITH SOFT START ELEMENT FORMED BETWEEN THE MOTOR ROTOR AND MOTOR OUTPUT SHAFT TO SUCCESSFULLY SYNCHRONIZE LOADS THAT HAVE HIGH INERTIA AND/OR HIGH TORQUE

(71) Applicant: Baldor Electric Company, Fort Smith, AR (US)

(72) Inventors: Stephen D. Umans, Belmont, MA (US); Donald L. Nisley, Greenville, SC (US); Michael J. Melfi, Richfield, OH (US)

(73) Assignee: Baldor Electric Company, Fort Smith, AK (US)

( * ) Notice: Subject to any disclaimer, the term of this patent is extended or adjusted under 35 U.S.C. 154(b) by 0 days.

(21) Appl. No.: 13/787,216

(22) Filed: Mar. 6, 2013

(65) Prior Publication Data

US 2013/0264990 A1 Oct. 10, 2013

Related U.S. Application Data

(63) Continuation-in-part of application No. 13/432,237, filed on Mar. 28, 2012.

(60) Provisional application No. 61/614,140, filed on Mar. 22, 2012.

(51) Int. Cl.
| | |
|---|---|
| *H02P 6/00* | (2006.01) |
| *F16D 27/00* | (2006.01) |
| *B22D 23/00* | (2006.01) |
| *H02P 1/46* | (2006.01) |
| *H02K 15/00* | (2006.01) |
| *H02K 7/118* | (2006.01) |
| *H02K 21/46* | (2006.01) |

(52) U.S. Cl.
CPC *H02P 1/46* (2013.01); *H02K 15/00* (2013.01); *H02K 21/46* (2013.01); *H02K 7/118* (2013.01)

USPC .......................... 318/705; 192/21.5; 164/109

(58) Field of Classification Search
USPC .......................... 318/705; 192/21.5; 164/109
See application file for complete search history.

(56) References Cited

U.S. PATENT DOCUMENTS

| | | | | |
|---|---|---|---|---|
| 2,895,580 | A * | 7/1959 | Badin | 192/58.1 |
| 4,120,388 | A | 10/1978 | Nisley | |
| 4,967,887 | A * | 11/1990 | Annacchino et al. | 192/21.5 |
| 5,758,709 | A * | 6/1998 | Boyd, Jr. | 164/109 |
| 2004/0035684 | A1 * | 2/2004 | Fukuoka | 198/788 |

OTHER PUBLICATIONS

International Search Report and Written Opinion for PCT/US2013/032790 dated Jun. 4, 2013.

* cited by examiner

*Primary Examiner* — Eduardo Colon Santana
*Assistant Examiner* — Gabriel Agared
(74) *Attorney, Agent, or Firm* — Thompson Coburn LLP

(57) ABSTRACT

A line-start synchronous motor has a housing, a rotor shaft, and an output shaft. A soft-start coupling portion is operatively coupled to the output shaft and the rotor shaft. The soft-start coupling portion is configurable to enable the synchronous motor to obtain synchronous operation and to drive, at least near synchronous speed during normal steady state operation of the motor, a load having characteristics sufficient to prevent obtaining normal synchronous operation of the motor when the motor is operatively connected to the load in the absence of the soft-start coupling. The synchronous motor is sufficiently rated to obtain synchronous operation and to drive, at least near synchronous speed during normal steady state operation of the motor, a load having characteristics sufficient to prevent obtaining normal synchronous operation of the motor when the motor is operatively connected to the load in the absence of the soft-start coupling.

22 Claims, 9 Drawing Sheets

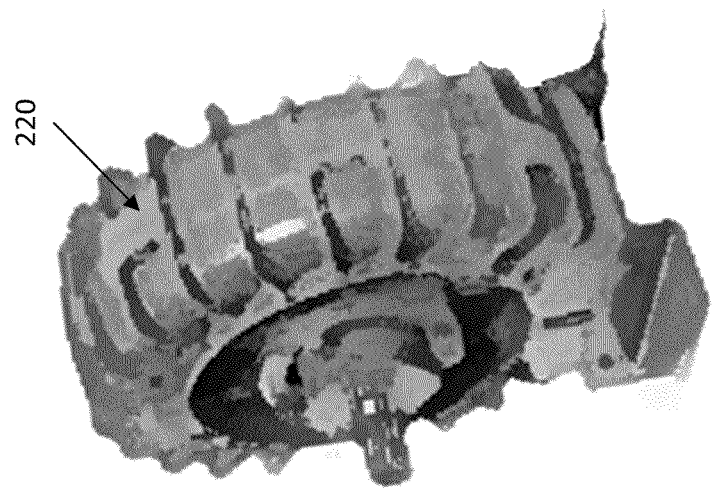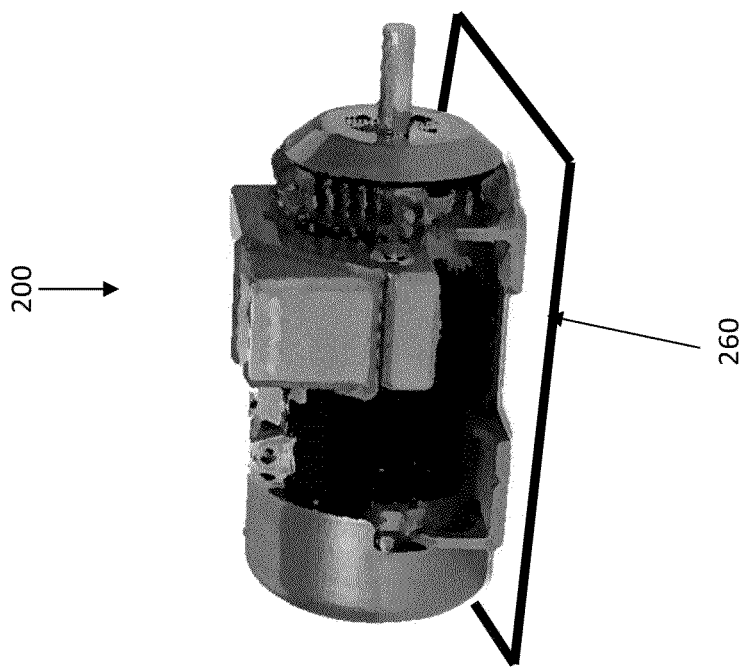
Fig. 8

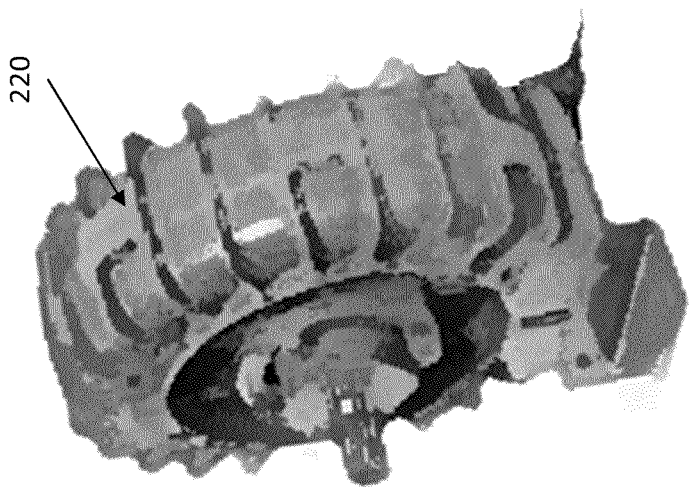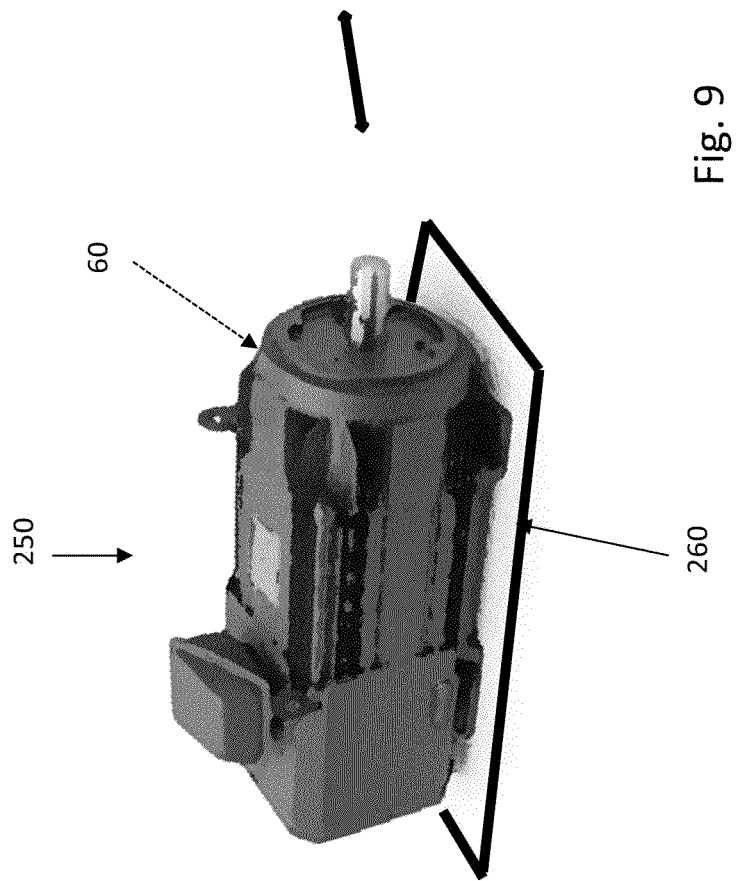
Fig. 9

SYNCHRONOUS MOTOR WITH SOFT START ELEMENT FORMED BETWEEN THE MOTOR ROTOR AND MOTOR OUTPUT SHAFT TO SUCCESSFULLY SYNCHRONIZE LOADS THAT HAVE HIGH INERTIA AND/OR HIGH TORQUE

RELATED APPLICATION DATA

This application claims the benefit of provisional application Ser. No. 61/614,140, filed Mar. 22, 2012, the disclosure of which is incorporated by reference herein. This application is a continuation-in-part of application Ser. No. 13/432,237 filed Mar. 28, 2012, the disclosure of which is incorporated by reference herein.

STATEMENT REGARDING FEDERALLY SPONSORED RESEARCH OR DEVELOPMENT

This invention was made with Government support under agreement no. DE-FG36-08GO18132 awarded by the Department of Energy. The Government has certain rights in this invention.

BACKGROUND

Synchronous motors, including permanent magnet motors and line-start permanent magnet motors, are typically very efficient. However, synchronous motors have limited capability to pull into synchronism loads that have a high torque or high inertia. Accordingly, the benefits in efficiency gains and energy savings ordinarily associated with synchronous motors are not typically achieved in applications having loads with high inertia and/or high torque characteristics. In the past, an inverter has been used with synchronous motors in such applications to power the motor during starting. However, an inverter adds substantial costs and degrades system efficiency.

To achieve the benefits of efficiency provided by synchronous motors, for instance, permanent magnet line-start motors, a soft-start element may be incorporated in the construction of the motor, specifically, between the rotor and the shaft. The soft-start element may be formed integrally within the motor housing and used as an interface between the synchronous motor rotor and the synchronous motor shaft. The soft start element of the motor output shaft may enable using the synchronous motor in applications involving a high inertia and/or high torque load. With the soft-start element, the synchronous motor may be able to bring such a load up to or near synchronous speed. The integrally formed soft-start element effectively isolates the synchronous motor from the high inertia and/or high torque load for enough time to enable the synchronous motor to come up to full synchronous speed. The integrally formed soft-start element then brings the load up to or near synchronous speed. In the case of a locking-type of soft-start element, the load speed will eventually be the same as the speed of the synchronous motor. For the case of a soft-start element that continues to slip even at steady state, the load speed will only approach but not equal the motor speed. As described below, a synchronous motor may be started directly across a polyphase power system and provide a dramatic reduction in noise and mechanical stress during the starting process due to a great reduction in torque ripple transmitted to the driven load. The soft-start element enables rapid acceleration of the motor by isolating the load from the motor temporarily until the motor comes up to synchronous speed.

DESCRIPTION OF THE DRAWINGS

FIG. 8 shows an arrangement involving an induction motor and a high torque/high inertia load; and FIG. 9 shows an arrangement in which the induction motor has been replaced with a synchronous motor with the soft-start feature.

DESCRIPTION OF THE DISCLOSED EMBODIMENTS

Figure 1:
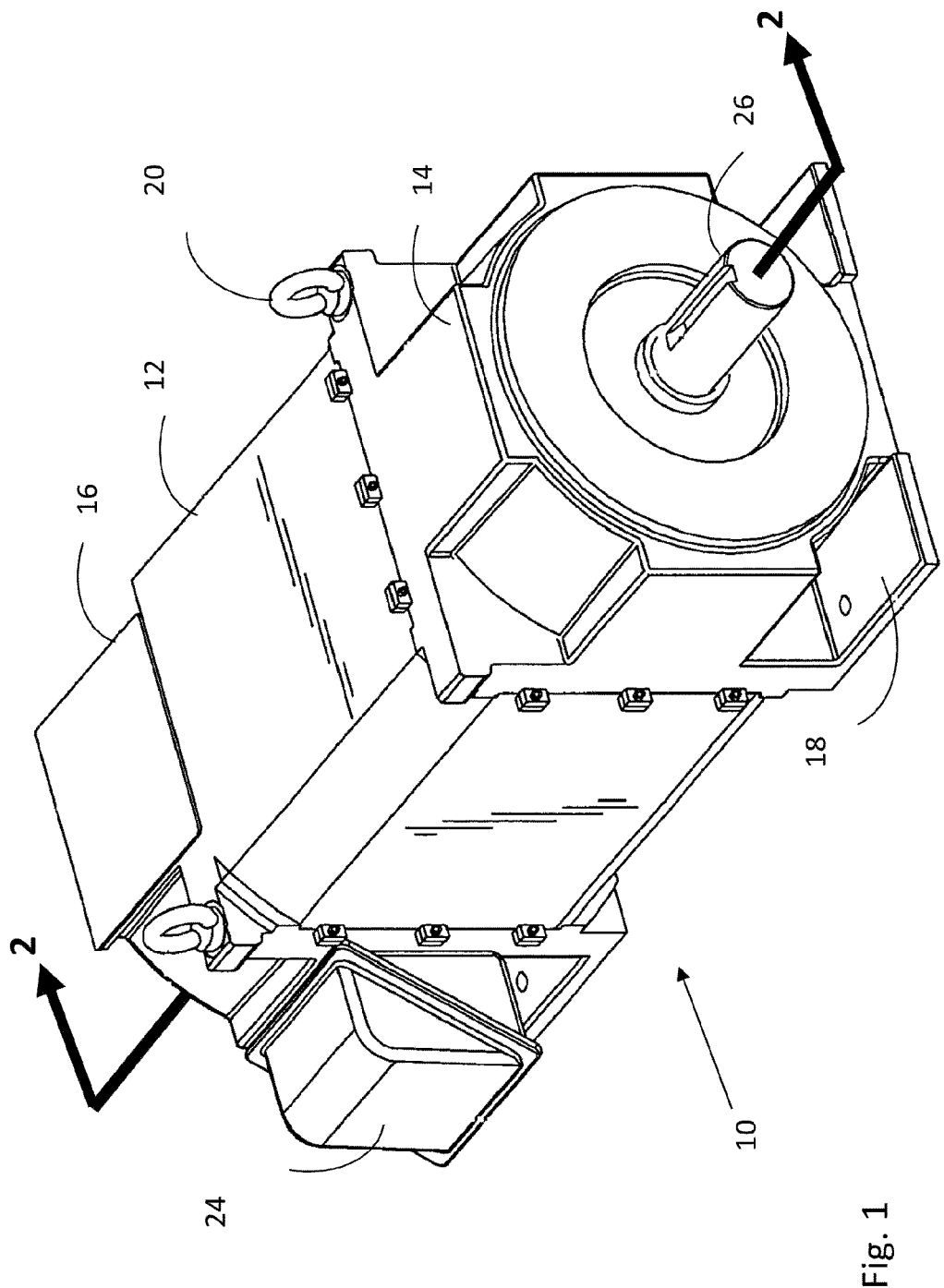
FIG. 1 is a perspective view of a synchronous motor.

Turning to the drawings, FIG. 1 illustrates an exemplary electric synchronous motor 10. In the embodiment illustrated, the motor 10 comprises a line start permanent magnet motor. The exemplary motor 10 comprises a frame 12 capped at each end by drive and opposite drive end caps 14,16, respectively. The frame 12 and the drive and opposite drive end caps 14,16 cooperate to form the enclosure or motor housing for the motor 10. The frame 12 and the drive and opposite drive end caps 14,16 may be formed of any number of materials, such as steel, aluminum, or any other suitable structural material. The drive and opposite drive end caps 14,16 may include mounting and transportation features, such as the illustrated mounting feet 18 and eyehooks 20.

To induce rotation of the rotor, current is routed through stator windings disposed in the stator. (See FIGS. 2 and 3). Stator windings are electrically interconnected to form groups. The stator windings are further coupled to terminal leads (not shown), which electronically connect the stator windings to an external power source (not shown), such as 480 VAC three-phrase power or 110 VAC single-phase power. A conduit box 24 houses the electrical connection between the terminal leads and the external power source. The conduit box 24 comprises a metal or plastic material, and advantageously, provides access to certain electrical components of the motor 10. Routing electrical current from its external power source through the stator windings produces a magnetic field that induces rotation of the rotor. As explained below in greater detail, a motor output shaft 26 is coupled to the rotor and provides a locator for a soft-start coupling element.

Figure 2:
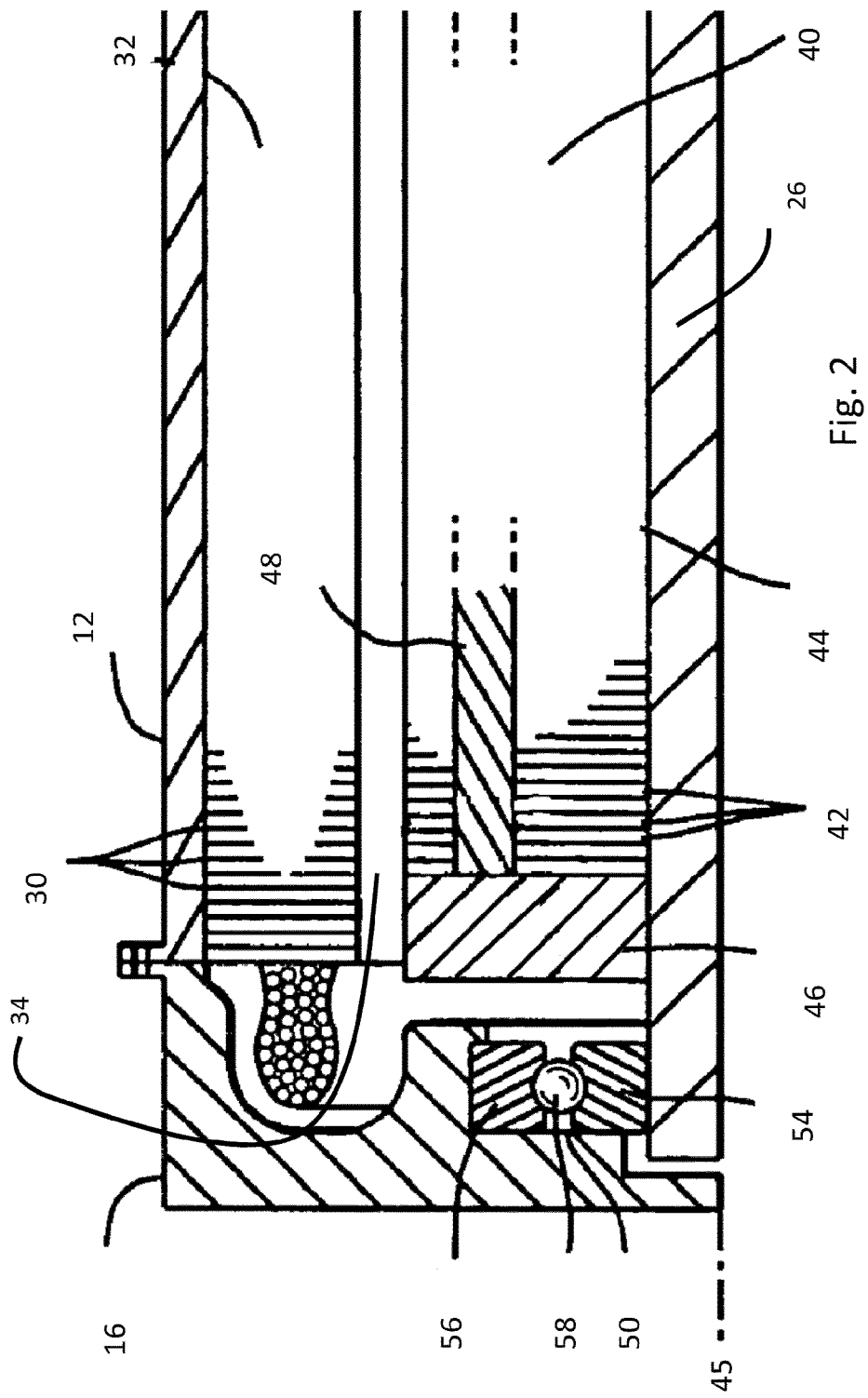
FIG. 2 is a partial cross-section view of the left hand side of the motor of FIG. 1 along plane 2-2.
Figure 3:
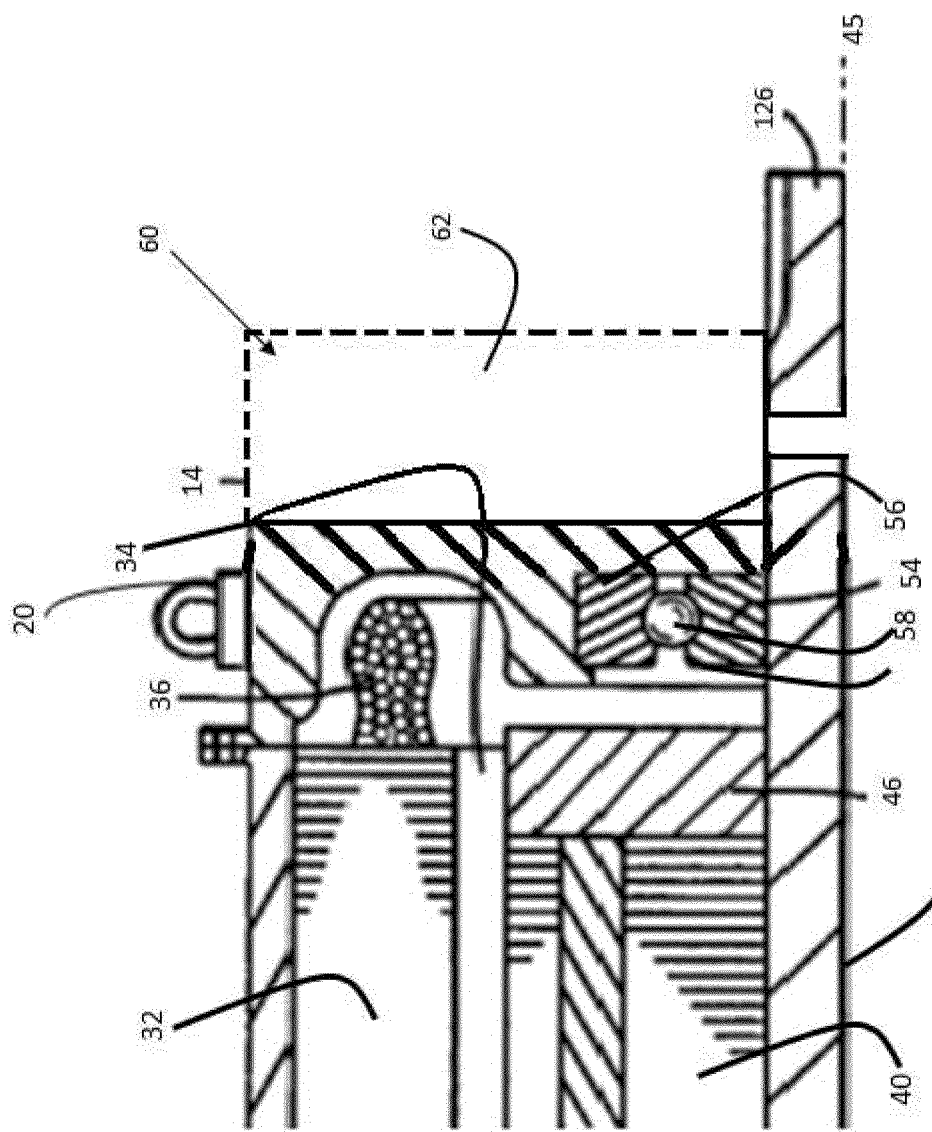
FIG. 3 is a partial cross-section view of the right hand side of the motor of FIG. 1 along plane 2-2.

FIG. 2 is a partial cross-section view of the left hand end of the motor 10 as shown in FIG. 1 along plane 2-2. FIG. 3 is a partial cross-section view of the right hand end of the motor 10 as shown in FIG. 1 along plane 2-2. To simplify the discussion, only the top portion of the motor 10 is shown, as the structure of the motor 10 is essentially mirrored along its centerline. As discussed above, the frame 12 and the drive and opposite drive end caps 14,16 cooperate to form an enclosure or motor housing for the motor 10. Within the enclosure or motor housing resides a plurality of stator laminations 30 juxtaposed and aligned with respect to one another to form a lamination stack, such as a contiguous stator core 32. In the exemplary motor 10, the stator laminations 30 are substantially identical to one another, and each stator lamination 30 includes features that cooperate with adjacent laminations to form cumulative features for the contiguous stator core 32. For example, each stator lamination 30 includes a central aperture that cooperates with the central aperture of adjacent stator laminations to form a rotor chamber 34 that extends the length of the stator core 32 and that is sized to receive a rotor. Additionally, each stator lamination 30 includes a plurality of stator slots disposed circumferentially about the central aperture. These stator slots cooperate to receive one or more stator windings 36, which are illustrated as coil ends in FIG. 2, that extend the length of the stator core 32. As described in more detail below, upon start-up, the stator winding is energizable with an alternating voltage to establish a rotating primary field that co-acts with the rotor bars of the squirrel cage winding to start the rotor under induction motor principles.

In the exemplary motor 10, a rotor assembly 40 resides within the rotor chamber 34. Similar to the stator core 32, the rotor assembly 40 comprises a plurality of rotor laminations 42 aligned and adjacently placed with respect to one another. Thus, the rotor laminations 42 cooperate to form a contiguous rotor core 44. When assembled, the rotor laminations 42 cooperate to form a shaft chamber that extends through the center of the rotor core 44 and that is configured to receive the rotor shaft 26 therethrough. The rotor shaft 26 is secured with respect to the rotor core 44 such that the rotor core 44 and the rotor shaft 26 rotate as a single entity about a rotor center axis 45.

The exemplary rotor assembly 40 also includes electrically conductive members, such as rotor bars 48, disposed in the rotor core 44 electrically connected to rotor end members 46 to form the starting cage. The end members 46, which are disposed on opposite ends of the rotor core 44 are generally circular in cross-section and have an outer diameter that generally approximates the diameter of the rotor laminations 42. The rotor bars 48 in cooperation with the end members 46 form at least one closed electrical pathway for induced current within the rotor 40. Accordingly, the rotor bars 48 and the end members 46 comprise materials having good electrical conductivity, such as aluminum and copper.

To support the rotor assembly 40, the exemplary motor 10 includes drive and opposite drive bearing sets 50,52, respectively, that are secured to the rotor shaft 126 and that facilitate rotation of the rotor assembly 40 within the stationary stator core 32. During operation of the motor 10, the bearing sets 50,52 transfer the radial and thrust loads produced by the rotor assembly 40 to the motor housing. Each bearing set 50,52 includes an inner race 54 disposed circumferentially about the rotor shaft 26. The tight fit between the inner race 54 and the rotor shaft 26 causes the inner race 54 to rotate in conjunction with the rotor shaft 26. Each bearing set 50,52 also includes an outer race 56 and rotational elements 58, which are disposed between the inner and outer races 54,56. The rotational elements 58 facilitate rotation of the inner races 54 while the outer races 56 remain stationary and mounted with respect to the drive and opposite drive end caps 14,16. Thus, the bearing sets 50,52 facilitate rotation of the rotor assembly 40 while supporting the rotor assembly 40 within the motor housing, i.e., the frame 12 and the drive and opposite drive end caps 14,16. To reduce the coefficient of friction between the races 54,56 and the rotational elements 58, the bearing sets 50,52 are coated with a lubricant. Although the drawings show the bearing sets 50,52 with balls as rotational elements, the bearing sets may be other constructions, such as sleeve bearings, pins bearings, roller bearings, etc.

FIGS. 3-7 show an exemplary soft-start element 60 integrated with the motor construction. The soft-start element may be provided in provided in a cavity 62 formed in the drive end cap 14 of the motor 10. The soft-start feature may also be disposed on the motor shaft outside of the drive end cap. The drawings show the drive end cap 14 in dashed lines to depict that locating the soft-start element, or a portion thereof, may be disposed in the drive end cap, or is optional. Specific features of the drive end cap 14 have been omitted for ease of illustration.

Although FIGS. 4-7 show a dry-fluid type of soft-start element, other types of soft-start elements may be used. For instance, fluid-based soft start elements may be used, including elements using magneto-rheological fluid. Additionally, soft start elements with and without a lock-up feature may be used. Specific details of the construction of the soft-start element 60 have been omitted for purposes of illustrating the principles of operation of the soft-start element. The description that follows is not intended to be limiting in any sense, and is used for purposes of illustration only.

Figure 4:
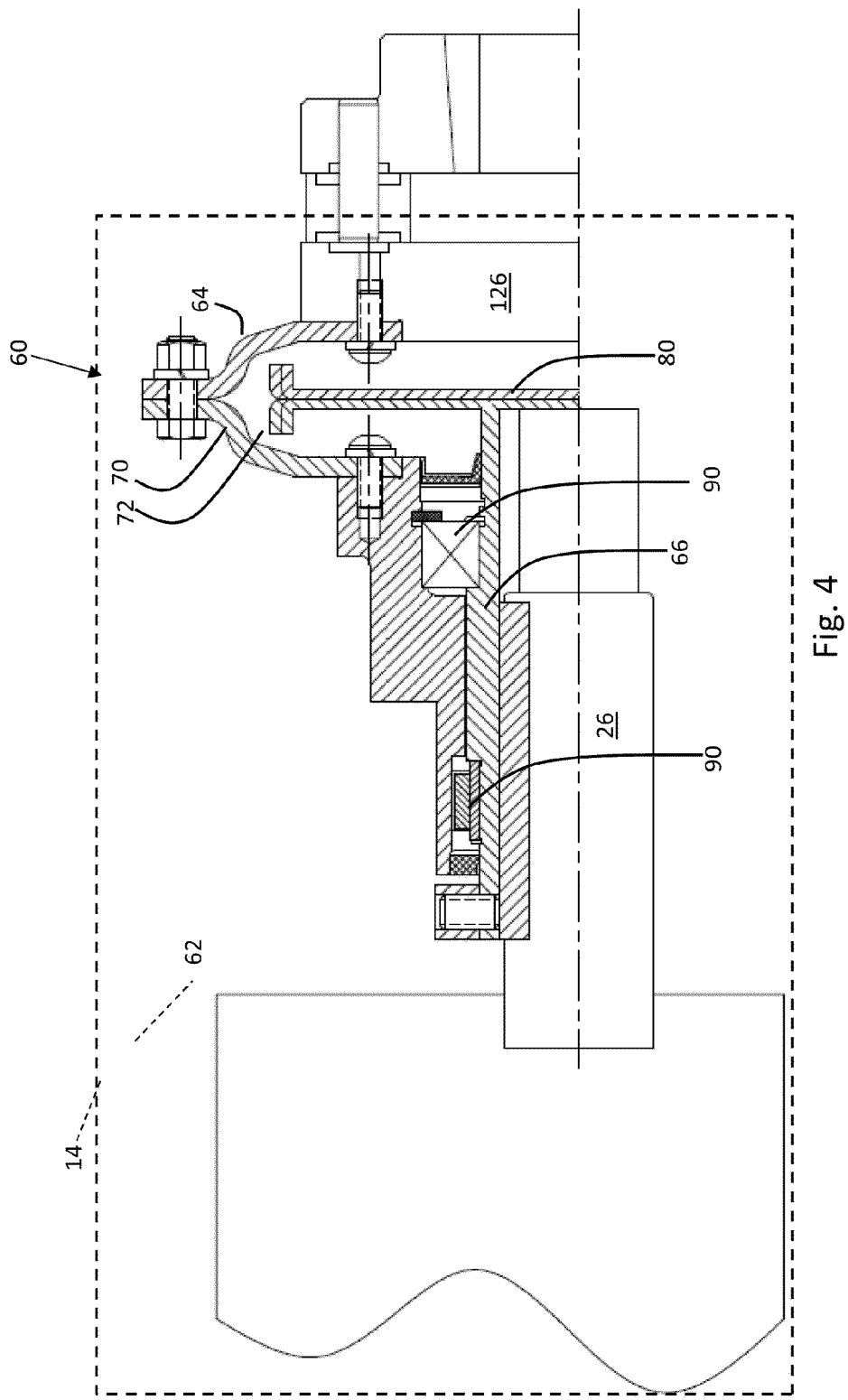
FIG. 4 is a partial cross-section view of a drive end of a motor with an integrated soft-start element disposed on an output shaft of the motor.

In FIG. 4, the soft-start element 60 comprises a housing 64 and a hub 66. The housing 64 is operatively connected to the load 126 and the hub 66 is operatively connected to the motor output 26. The housing 64 has a generally tapered cross section becoming narrow at its periphery 70. The housing 64 has a hollow interior 72 which is filled with a dry fluid, for instance, steel shot. An access may be provided in the housing 64 to allow introducing or removing dry fluid from the housing interior 72. The access may be accessed through an aperture in the drive end cap 14, as necessary depending upon the application and configuration of the drive end cap. In the housing interior, there is a rotor 80 comprising a circular disk-like element connected to the hub 66. To permit relative motion between the housing and hub, a bearing set 90 is provided. The bearing set 90 has rotational elements that may comprise ball shaped rotational elements or the bearing set may be other constructions, such as sleeve bearings, pins bearings, roller bearings, etc.

During operation, the dry fluid in the housing interior 72 is thrown around toward the outer periphery 70 of the housing 64 by centrifugal force and contacts the rotor 80. As the rotor shaft 26 and hub 66 accelerates in rotation, the dry fluid initially permits slippage and relative rotation between the housing 64, and the hub 66 and rotor shaft 26. As the rotation approaches synchronous speed, the dry fluid forms a virtually solid mass packed between the internal walls of the housing and the rotor 80, thereby effectively locking the components together. Thus, the slippage which occurs during the initial stages of starting the motor produces a smooth acceleration without placing an abrupt load on the motor or equipment. The formation of the solid mass as the housing approaches synchronous speed results in freedom of slippage, giving an operating efficiency and a transmission of power from the rotor shaft 26 to the load 126 of approximately 100 percent. The amount of dry fluid in the housing interior 72 may be adjusted to accommodate a desired amount of slippage or acceleration between the rotor shaft 26 and the load 126. Longer acceleration times will occur when less dry fluid is used and faster acceleration, from stop to full speed, will be observed with greater amounts of dry fluid levels. For instance, the level of dry fluid may be set so that the motor achieves synchronous speed when loaded with the load nearly instantaneously after starting of the motor. The level of dry fluid may be set so that the motor thereafter brings the load to synchronous speed. The level of dry fluid may also be set so that the load has no or minimal slip after the motor is operating at synchronous speed. To the extent, other types of soft-start couplings are used, they may be configured as necessary to set acceleration time for a given load. For instance, in a coupling using magneto-rheological fluid, the amount of fluid and applied magnetic field may be adjusted as necessary.

The soft start element may be provided to sufficiently dissipate heat generated while the load is brought up to synchronous or near synchronous speed. Use of the soft start element enables heat otherwise generated in the motor during starting to be transferred to the soft start element where generated heat may be dissipated without causing detrimental effects in the motor, for instance, demagnetization of permanent magnet rotor components. The amount of fill material, the type of soft start element, and the ratings of the soft start element are among criteria that may be considered in selecting a soft start element for an application where heat generation, particularly, in the motor, is a concern. By integrating the soft-start element with the motor, the soft-start element may be preset, for instance, ratings set, heat dissipation characteristics, level of fluid, for a specific motor ratings thereby allowing a close pairing of the motor and soft-start element to facilitate the end-user application.

Figure 5:
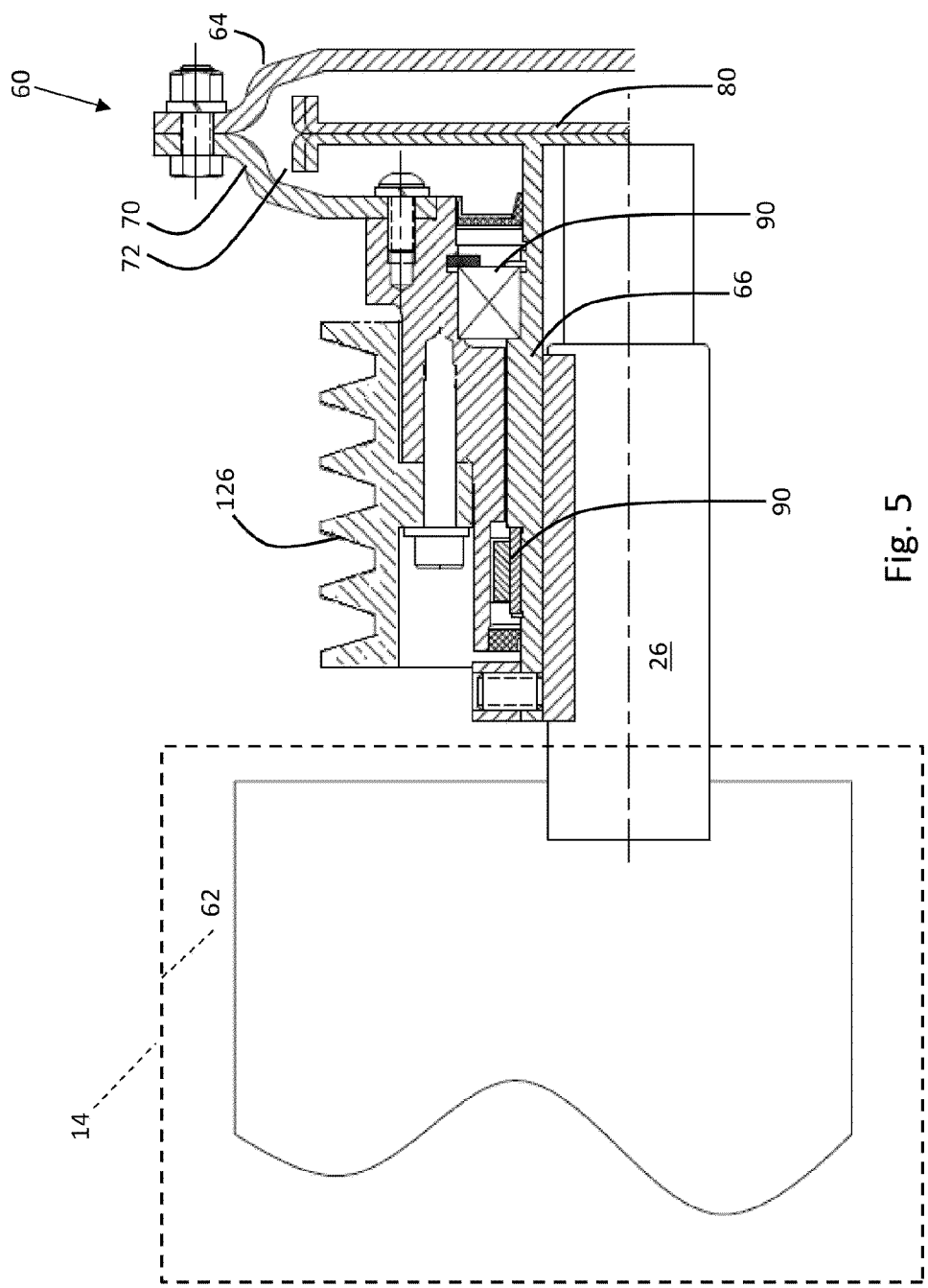
FIG. 5 is alternate partial cross-section view of a drive end side of a motor with an integrated soft-start element disposed on an output shaft of the motor.

FIG. 5 shows an arrangement similar to FIG. 4 where the rotor shaft 26 is operatively connected to the hub 66 of the soft-start element 60 and the load 126 is operatively connected to the housing 64 of the soft-start element. In FIG. 5, the load 126 comprises a V-shaped pulley.

Figure 6:
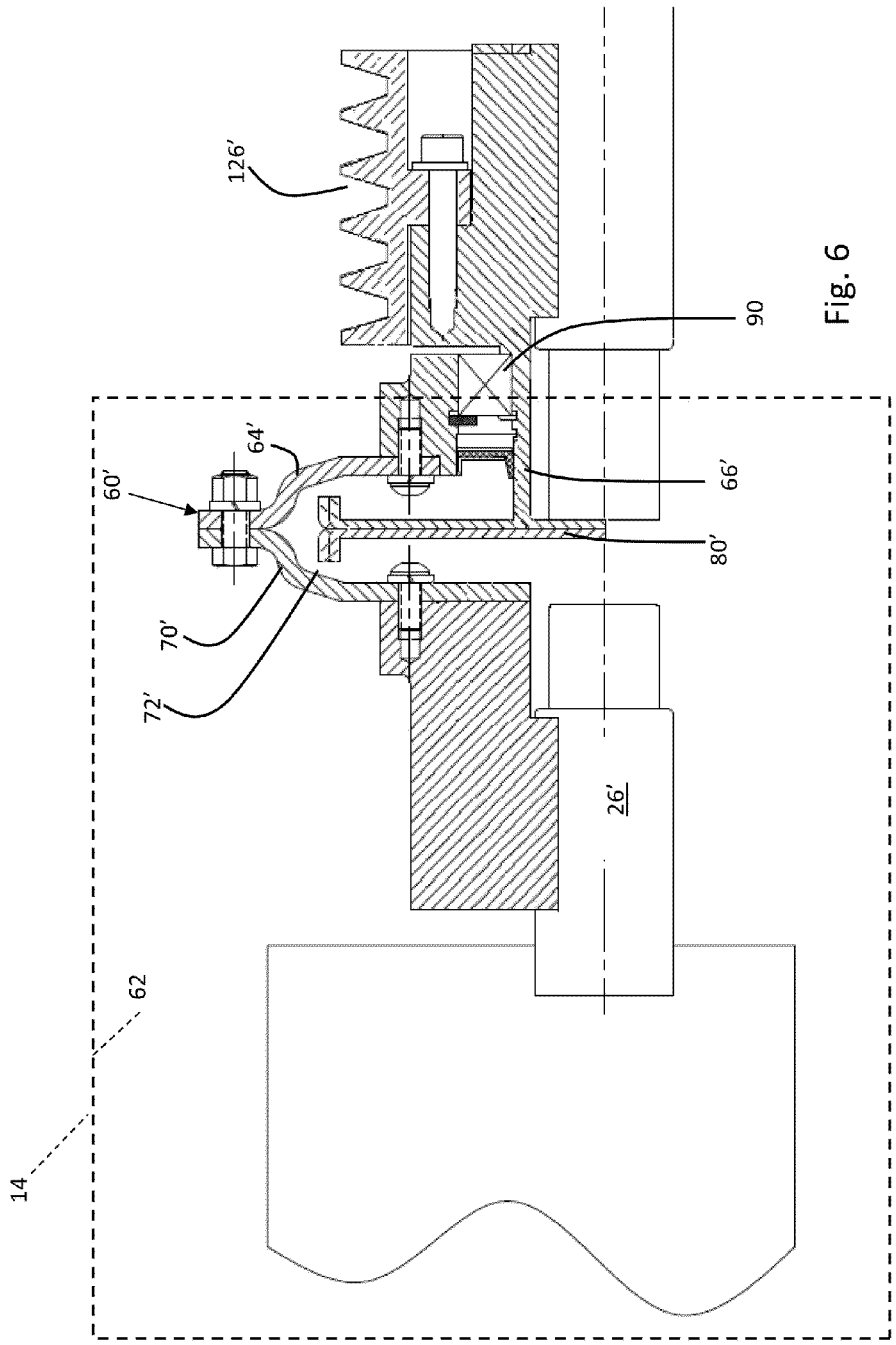
FIG. 6 is a further alternate partial cross-section view of a drive end side of a motor with an integrated soft-start element disposed on an output shaft of the motor.

FIG. 6 shows an arrangement with the rotor shaft 26' is operatively connected to the housing 64' of the soft-start element 60', and the hub 66' of the soft-start element is operatively connected to the load 126'. In FIG. 6, the load 126' comprises a V-shaped pulley.

Figure 7:
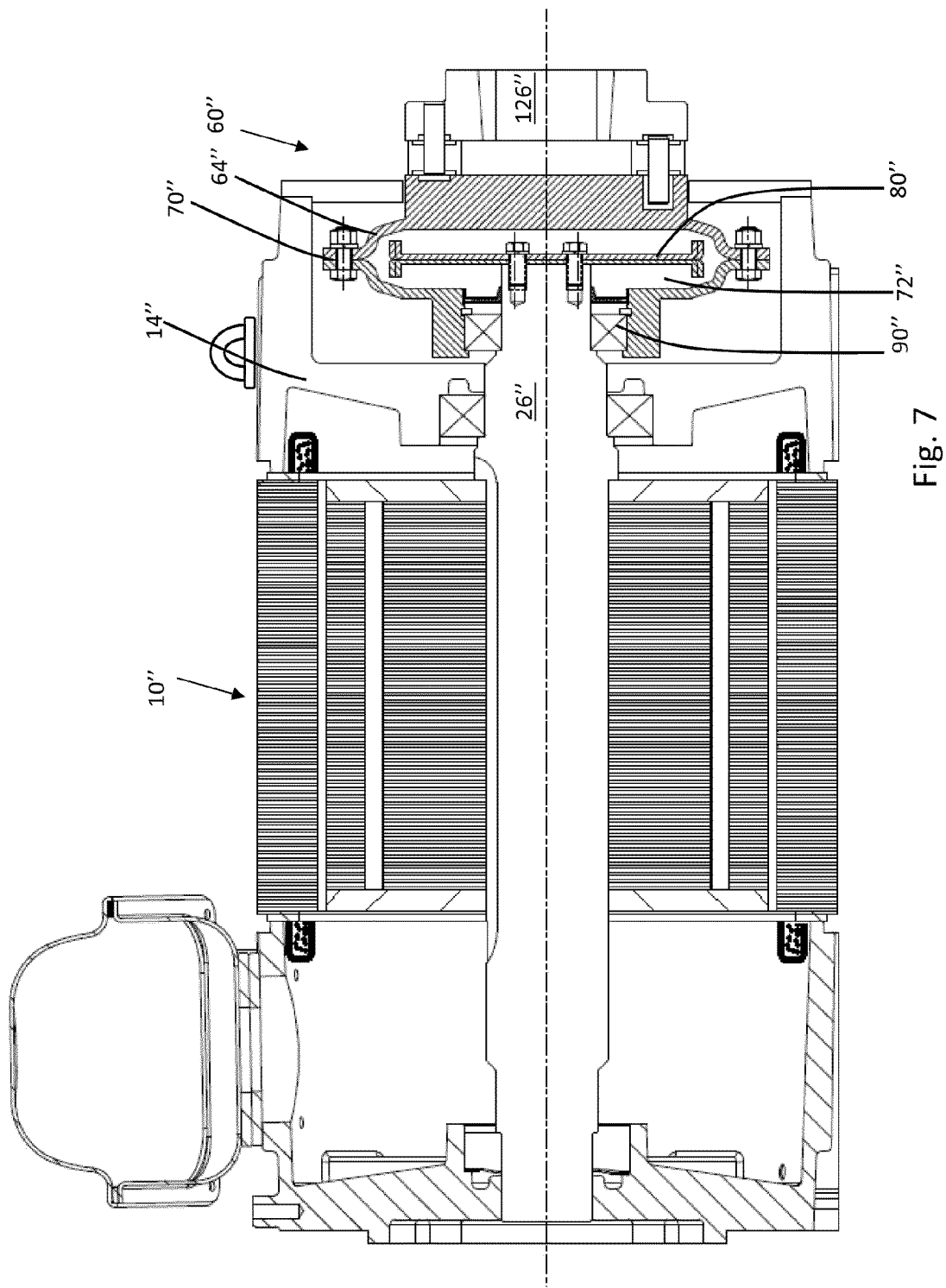
FIG. 7 is a further alternate partial cross-section view of a motor with an integrated soft-start element disposed on an output shaft of the motor.

FIG. 7 shows an arrangement with the rotor shaft 26" connected directly to the rotor 80" of the soft-start element 60", and the housing 64" of the soft-start element connected to the load 126".

A soft start element incorporated into the synchronous motor enables a synchronous motor to synchronize a load having high torque or heavy inertia. The synchronous motor may come up to synchronous speed and eventually drive the high inertial load at or near synchronous speed. Accordingly, the energy efficiency provided by a synchronous motor may be used to drive high loads that the synchronous motor might not otherwise drive through use of the soft-start element. In this way, the synchronous motor may replace induction motors previously used for such loads, and result in an increase in efficiency of the system without the need to add additional components that may contribute to overall system losses.

It is expected that the overall current drawn by a synchronous motor having the soft-start element during starting will be significantly less than that of a synchronous motor without soft-start capability. Likewise, the current transients experienced by a synchronous motor having the soft-start element during starting will be significantly less than that of a synchronous motor without soft-start capability the motor. A synchronous motor having the soft-start element will be able to attain synchronous speed nearly immediately upon starting and maintain synchronous speed during normal steady state operation. A synchronous motor having the soft-start element will be able to bring the load from start to synchronous or near synchronous speed while maintaining synchronous speed.

FIG. 8 shows a typical application involving an induction motor 200 and a high torque/high inertia load 220. Induction motors 200 are typically used in such applications due to their lower cost, simpler construction, and ability to generate high torque at low speeds, for instance, during start-up.

FIG. 9 shows an application involving a synchronous motor 250 with a soft-start element 60 integrated in the motor construction. Because the soft-start element 60 is integrated in the motor construction, the motor may be directly coupled to the load 220 without additional components. Because of the potential savings through efficiency gains and thereby energy savings, the induction motor 200 of FIG. 8 may be replaced with the synchronous motor 250 of FIG. 8 and installed in the same footprint area 260 as the induction motor of FIG. 8. The synchronous motor 250 may be mounted to an existing structure in the footprint area 260 to which the induction motor 200 was mounted, preferably in the location where the induction motor was originally mounted, so that the shaft of the synchronous motor is sufficiently aligned to directly couple to the shaft of the load 220 through the soft start element 60. The amount of dry fluid in soft-start element may then be set for a desired acceleration time for a given load. For instance, the level of dry fluid may be set so that the motor achieves synchronous speed when loaded with the load nearly instantaneously after starting of the motor. The level of dry fluid may be set so that the motor thereafter brings the load to synchronous speed. The level of dry fluid may also be set so that the load has no or minimal slip after the motor is operating at synchronous speed. To the extent, other types of soft-start elements are used, they may be configured as necessary to set acceleration time for a given load. For instance, in an element using magneto-rheological fluid, the amount of fluid and applied magnetic field may be adjusted as necessary.

The soft-start element to couple a high inertia/high torque load to a synchronous motor expands the capability and use of a synchronous motor to applications previously solely relegated to the use of induction motors. Thus, the efficiency and energy saving of synchronous motors may be achieved in a wide range of applications through the use of the soft start element incorporated into the construction of the synchronous motor.

While specific embodiments have been described in detail and in the foregoing detailed description and illustrated in the accompanied drawings, those with ordinary skill in the art will appreciate that various modifications and alternatives to those details could be developed in light of the overall teachings of the disclosure. Accordingly, the specific embodiments disclosed were meant to be illustrative only and not limited as to the scope of the invention, which is to be given the full breath of the appended claims and any and all equivalents thereof.

What is claimed:

1. A line-start synchronous motor comprising;
a stator;
end caps on axially opposite ends of the stator forming an exterior of the motor;
a rotor core disposed within the stator;
a rotor shaft of the motor extending from the rotor core;
an output shaft of the motor; and
a soft-start element operatively coupling the output shaft and the rotor shaft, the soft-start element being configurable to enable the synchronous motor to obtain synchronous operation and to drive, at least near synchronous speed during normal steady state operation of the motor, a load having characteristics sufficient to prevent obtaining normal synchronous operation of the motor were the motor otherwise operatively connected to the load in the absence of the soft-start element;
wherein the synchronous motor is sufficiently rated to obtain synchronous operation and to drive, at least near synchronous speed during normal steady state operation of the motor, a load having characteristics sufficient to prevent obtaining normal synchronous operation of the motor were the motor otherwise operatively connected to the load in the absence of the soft-start element; and wherein the soft-start element comprises:
- a housing having an interior partially filled with a fluid, the fluid being one of magneto-rheological fluid and a dry fluid, the housing having an opening; and
- a hub having an extension portion extending through the soft-start element housing opening into the housing interior, the extension portion having a rotor assembly extending radially outward in the soft-start element housing interior for rotation within the soft-start element housing interior.

2. The motor of claim 1, wherein the soft-start element has characteristics sufficient to dissipate a portion of an amount of heat that is otherwise generated by the motor during starting were the motor otherwise operatively connected to the load in the absence of the soft-start element.

3. The motor of claim 1, wherein the soft-start element is disposed within the end cap of the motor.

4. A line-start synchronous motor comprising;
- a stator for the motor;
- a rotor core disposed in the stator of the motor and having a rotor shaft extending therefrom;
- a housing portion formed around at least a portion of an axially end of the stator;
- an output shaft of the motor; and
- a soft-start element operatively coupled to the output shaft and rotor shaft, the soft-start element being configurable to allow the synchronous motor to attain synchronous speed nearly immediately after starting of the motor with the motor output shaft operatively connected to a load having characteristics sufficient to prevent normal starting including synchronization of the motor were the motor otherwise operatively connected to the load in the absence of the soft start element; and
- wherein the synchronous motor is sufficiently rated to obtain synchronous operation and to drive, from start to at least near synchronous speed during normal steady state operation of the motor, a load having characteristics sufficient to prevent normal starting including synchronization of the motor were the motor otherwise operatively connected to the load in the absence of the soft-start element; and
- wherein the soft-start element comprises:
  - a housing having an interior partially filled with a fluid, the fluid being one of magneto-rheological fluid and a dry fluid, the housing having an opening; and
  - a hub having an extension portion extending through the soft-start element housing opening into the housing interior, the extension portion having a rotor assembly extending radially outward in the soft-start element housing interior for rotation within the soft-start element housing interior.

5. The motor of claim 4, wherein the soft-start element comprises a lock-up feature.

6. The motor of claim 4, wherein the soft-start element comprises a hollow interior partially filled with a dry fluid.

7. The motor of claim 4, wherein the soft-start element is disposed within the motor housing portion.

8. The motor of claim 4, wherein the soft-start element housing is operatively connected to the motor output shaft, and the soft-start element rotor is operatively connected to the motor rotor shaft.

9. The motor of claim 8, wherein the coupling housing interior has an amount of fluid sufficient to enable the motor to achieve synchronous speed when loaded with the load nearly instantaneously after starting of the motor.

10. A method comprising:
- providing a line-start permanent magnet synchronous motor, the motor having a housing portion adjacent to an axial end of the motor, the motor having an output shaft of the motor and a rotor shaft, the motor having a soft-start element operatively coupling the rotor shaft to the motor output shaft; and
- configuring the soft-start element portion to enable the synchronous motor to obtain synchronous operation and to drive, at least near synchronous speed during normal steady state operation of the motor, a load having characteristics sufficient to prevent obtaining normal synchronous operation of the motor were the motor otherwise operatively connected to the load in the absence of the soft-start element;
- wherein the synchronous motor is sufficiently rated to obtain synchronous operation and to drive, at least near synchronous speed during normal steady state operation of the motor, a load having characteristics sufficient to prevent obtaining normal synchronous operation of the motor were the motor otherwise operatively connected to the load in the absence of the soft-start element; and
- wherein the soft-start element portion comprises:
  - a housing having an interior partially filled with a fluid, the fluid being one of magneto-rheological fluid and a dry fluid, the housing having an opening; and
  - a hub having an extension portion extending through the soft-start element housing opening into the housing interior, the extension portion having a rotor assembly extending radially outward in the soft-start element housing interior for rotation within the soft-start element housing interior.

11. The method of claim 10, wherein the soft-start element portion has characteristics sufficient to dissipate a portion of an amount of heat that is otherwise generated by the motor during starting were the motor otherwise operatively connected to the load in the absence of the soft-start coupling element portion.

12. The method of claim 10, wherein the soft start element portion is disposed within at least a portion of the housing portion.

13. The method of claim 10, further comprising operatively coupling the synchronous motor output shaft to a load.

14. The method of claim 13 further comprising removing an induction motor from the load before operatively connecting the synchronous motor output shaft to the load.

15. The method of claim 14 further comprising configuring mounts of the synchronous motor to allow mounting of the synchronous motor in the induction motor's pre-removal location.

16. A method comprising:
- providing a line-start permanent magnet synchronous motor, the motor having a stator and a rotor core disposed in the stator, the rotor core having a shaft extending therefrom, the motor having housing portion formed around at least a portion of an axially end of the stator, the motor having an output shaft operatively coupled to the motor rotor shaft with a soft-start element;
- configuring the soft-start element in a manner to enable the synchronous motor to attain synchronous speed nearly immediately after starting of the motor with the motor output shaft operatively connected to a load having characteristics sufficient to prevent normal starting including synchronization of the motor when the motor is operatively connected to the load in the absence of the soft-start element; and wherein the synchronous motor is sufficiently rated to obtain synchronous operation and to drive from start to at least near synchronous speed during normal steady state operation of the motor a load having characteristics sufficient to prevent normal starting including synchronization of the motor when the motor is operatively connected to the load in the absence of the soft-start element; and wherein the soft-start element portion comprises:
    a housing having an interior partially filled with a fluid, the fluid being one of magneto-rheological fluid and a dry fluid, the housing having an opening; and
    a hub having an extension portion extending through the soft-start element housing opening into the housing interior, the extension portion having a rotor assembly extending radially outward in the soft-start element housing interior for rotation within the soft-start element housing interior.

17. The method of claim 16, wherein the soft-start element comprises a lock-up feature.

18. The method of claim 16, wherein the soft-start element hollow interior is partially filled with a dry fluid.

19. The method of claim 16, wherein the soft-start element is disposed within at least a portion of the motor housing portion.

20. The method of claim 16, wherein the soft-start element housing is configured to be operatively connected to the motor output shaft; and the soft-start element rotor is operatively connected to the motor rotor shaft.

21. The method of claim 16 further comprising selecting an amount of dry fluid for the housing interior sufficient to enable the motor to achieve synchronous speed when loaded with the load nearly instantaneously after starting of the motor.

22. The method of claim 16, wherein the soft-start element has characteristics sufficient to dissipate a portion of an amount of heat otherwise generated by the motor during starting in the absence of the soft-start element being operatively connected to the load.

* * * * *